US012014461B2

(12) United States Patent
Lin

(10) Patent No.: US 12,014,461 B2
(45) Date of Patent: Jun. 18, 2024

(54) METHOD FOR CONSTRUCTING THREE-DIMENSIONAL MODEL OF TARGET OBJECT AND RELATED APPARATUS

(71) Applicant: Tencent Technology (Shenzhen) Company Limited, Shenzhen (CN)

(72) Inventor: Xiangkai Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 135 days.

(21) Appl. No.: 17/667,399

(22) Filed: Feb. 8, 2022

(65) Prior Publication Data

US 2022/0165031 A1   May 26, 2022

Related U.S. Application Data

(63) Continuation of application No. PCT/CN2020/126341, filed on Nov. 4, 2020.

(30) Foreign Application Priority Data

Jan. 2, 2020 (CN) .......................... 202010003052.X

(51) Int. Cl.
*G06T 7/246* (2017.01)
*G06T 7/50* (2017.01)
(Continued)

(52) U.S. Cl.
CPC .............. *G06T 17/20* (2013.01); *G06T 7/246* (2017.01); *G06T 7/50* (2017.01); *G06T 7/75* (2017.01);
(Continued)

(58) Field of Classification Search
CPC .. G06T 7/246; G06T 7/50; G06T 7/70; G06T 7/73; G06T 7/75; G06T 17/20;
(Continued)

(56) References Cited

U.S. PATENT DOCUMENTS

| 9,984,499 B1 | 5/2018 | Jurgenson et al. |
| 2018/0211399 A1 | 7/2018 | Lee et al. |

(Continued)

FOREIGN PATENT DOCUMENTS

| CN | 104050712 A | 9/2014 |
| CN | 107230225 A | 10/2017 |

(Continued)

OTHER PUBLICATIONS

Liu, Lingyun, et al. "Multiview geometry for texture mapping 2d images onto 3d range data." 2006 IEEE Computer Society Conference on Computer Vision and Pattern Recognition (CVPR'06). vol. 2. IEEE (Year: 2006).*

(Continued)

*Primary Examiner* — Diane M Wills
(74) *Attorney, Agent, or Firm* — Morgan, Lewis & Bockius LLP

(57) ABSTRACT

A method for constructing a 3D model of a target object provided is performed by a computer device, the method including: obtaining at least two initial images of a target object from a plurality of shooting angles, the at least two initial images respectively including depth information of the target object, and the depth information indicating distances between a plurality of points of the target object and a reference position; obtaining first point cloud information corresponding to the at least two initial images respectively according to the depth information in the at least two initial images; fusing the first point cloud information respectively corresponding to the at least two initial images into second point cloud information; and constructing a 3D model of the target object according to the second point cloud information.

19 Claims, 10 Drawing Sheets

(51) Int. Cl.
*G06T 7/73* (2017.01)
*G06T 17/20* (2006.01)
*G06T 19/00* (2011.01)

(52) U.S. Cl.
CPC .... *G06T 19/00* (2013.01); *G06T 2207/10028* (2013.01); *G06T 2207/20068* (2013.01); *G06T 2207/20221* (2013.01); *G06T 2207/30244* (2013.01)

(58) Field of Classification Search
CPC ........... G06T 19/00; G06T 2207/10028; G06T 2207/20068; G06T 2207/20221; G06T 2207/30244
See application file for complete search history.

(56) References Cited

U.S. PATENT DOCUMENTS

| | | | |
|---|---|---|---|
| 2019/0122377 A1* | 4/2019 | Chen | G06T 7/55 |
| 2019/0228569 A1* | 7/2019 | Chien | H04N 13/218 |
| 2020/0156251 A1* | 5/2020 | Huang | G06T 7/73 |

FOREIGN PATENT DOCUMENTS

| | | | | |
|---|---|---|---|---|
| CN | 108717728 A | 10/2018 | | |
| CN | 109242961 A | 1/2019 | | |
| CN | 109304866 A | 2/2019 | | |
| CN | 109377551 A | 2/2019 | | |
| CN | 109658449 A | 4/2019 | | |
| CN | 109693387 A | 4/2019 | | |
| CN | 110223387 A | 9/2019 | | |
| CN | 110363858 A | * 10/2019 | ............. | G06T 15/04 |
| CN | 110363858 A | 10/2019 | | |
| CN | 110458957 A | 11/2019 | | |
| CN | 111160232 A | * 5/2020 | | |
| CN | 111199579 A | 5/2020 | | |

OTHER PUBLICATIONS

Tencent Technology, ISR, PCT/CN2020/126341, Feb. 10, 2021, 2 pgs.
Tencent Technology, WO, PCT/CN2020/126341, Feb. 10, 2021, 5 pgs.
Tencent Technology, IPRP, PCT/CN2020/126341, Jul. 5, 2022, 6 pgs.

* cited by examiner

Algorithm 1 HC-algorithm $p := o$; // initialize points with original locations
repeat
  $q := p$;
  for all $i \in V_{ctr}$ do
    $n := |Adj(i)|$;
    if $n \neq 0$ then
      $p_i := \frac{1}{n} \sum_{j \in Adj(i)} q_j$; // Laplacian operation
    end if
    $b_i := p_i - (\alpha o_i + (1-\alpha)q_i)$;
  end for
  for all $i \in V_{ctr}$ do
    $n := |Adj(i)|$;
    if $n \neq 0$ then
      $p_i := p_i - (\beta b_i + \frac{1-\beta}{n} \sum_{j \in Adj(i)} b_j)$;
    end if
  end for
until <condition>  // e.g. smooth enough

FIG. 5b

METHOD FOR CONSTRUCTING THREE-DIMENSIONAL MODEL OF TARGET OBJECT AND RELATED APPARATUS

CROSS-REFERENCE TO RELATED APPLICATIONS

This application is a continuation application of PCT Patent Application No. PCT/CN2020/126341, entitled "METHOD FOR CONSTRUCTING THREE-DIMENSIONAL MODEL OF TARGET OBJECT, AND RELATED APPARATUS" filed on Nov. 4, 2020, which claims priority to Chinese Patent Application No. 202010003052.X, filed with the State Intellectual Property Office of the People's Republic of China on Jan. 2, 2020, and entitled "METHOD AND APPARATUS FOR CONSTRUCTING THREE-DIMENSIONAL MODEL OF TARGET OBJECT, DEVICE, AND STORAGE MEDIUM", all of which are incorporated herein by reference in their entirety.

FIELD OF THE TECHNOLOGY

This application relates to the field of electronic technologies, and in particular, to the construction of a three-dimensional (3D) model of a target object.

BACKGROUND OF THE DISCLOSURE

Face reconstruction technology is a technology that reconstructs a three-dimensional (3D) face model from one or more two-dimensional (2D) face images. In a specific working process, a user stands within a field of view of a shooting lens and turns the head as instructed so that the shooting lens can capture face images of the user from different angles, where instruction information used for instructing the user to turn the head may be sent by a terminal responsible for controlling the shooting lens, such as a smartphone or a tablet computer with a camera function.

The face reconstruction technology is widely applied to various fields. For example, in the entertainment field, when a user is playing a 3D game, the face model of the user may be reconstructed so that the game character resembles the user, which makes the construction of the 3D game character more personalized.

SUMMARY

In view of the previous description, to resolve the problem above, this application provides the technical solution as follows:

According to one aspect, embodiments of this application provide a method for constructing a three-dimensional (3D) model of a target object performed by a computer device, the method including:

obtaining at least two initial images of a target object from a plurality of shooting angles, the at least two initial images respectively including depth information of the target object, and the depth information indicating distances between a plurality of points of the target object and a reference position;

obtaining first point cloud information corresponding to the at least two initial images respectively according to the depth information in the at least two initial images;

fusing the first point cloud information respectively corresponding to the at least two initial images into second point cloud information; and constructing a 3D model of the target object according to the second point cloud information.

According to another aspect, the embodiments of this application provide a computer device, including: a processor, and a memory, the memory storing program instructions that, when executed by the processor, cause the computer device to perform the method according to the aspect above.

According to another aspect, the embodiments of this application provide a non-transitory computer-readable storage medium, configured to store program instructions, the program instructions, when executed by a processor of a computer device, causing the computer device to perform the method according to the aspect above.

The method for constructing a 3D model of a target object according to the embodiments of this application includes: obtaining at least two initial images of a target object from a plurality of shooting angles, the at least two initial images respectively recording depth information of the target object, and the depth information being used for recording distances between a plurality of points of the target object and a reference position; obtaining first point cloud information corresponding to the at least two initial images respectively according to the depth information in the at least two initial images; fusing the first point cloud information respectively corresponding to the at least two initial images into second point cloud information; and constructing a 3D model of the target object according to the second point cloud information. Without building an additional storage space, a process of constructing a 3D model can be implemented. The 3D model of the target object is constructed directly in a manner of point cloud fusion, which maximizes the utilization efficiency of a storage space and enables a terminal to efficiently perform a modeling process of face reconstruction.

BRIEF DESCRIPTION OF THE DRAWINGS

To describe the technical solutions in embodiments of this application or in the related art more clearly, the following briefly describes the accompanying drawings required for describing the embodiments or the related art. Apparently, the accompanying drawings in the following descriptions show merely the embodiments of this application, and a person of ordinary skill in the art may still derive other drawings from the accompanying drawings without creative efforts.

FIG. 5b is a schematic diagram of a smoothing algorithm in a method for constructing a 3D model of a target object according to the embodiments of this application.

DESCRIPTION OF EMBODIMENTS

Figure 1:
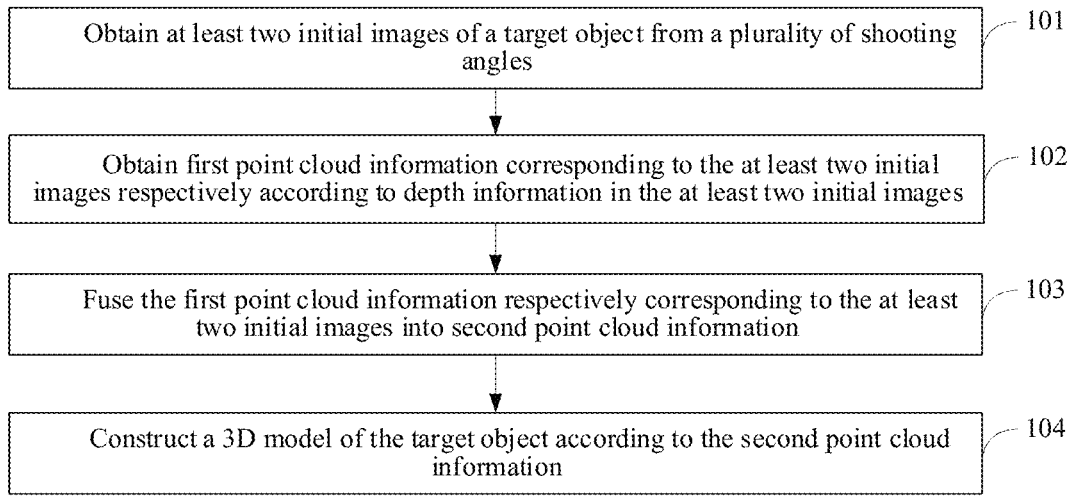
FIG. 1 is a flowchart of an embodiment of a method for constructing a three-dimensional (3D) model of a target object according to the embodiments of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first", "second", "third", and "fourth" (if any) in the specification and claims of this application and in the accompanying drawings are used for distinguishing between similar objects and not necessarily used for describing any particular order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Face reconstruction technology is a technology that reconstructs a three-dimensional (3D) face model from one or more two-dimensional (2D) face images. In a specific working process, a user stands within a field of view of a shooting lens and turns the head as instructed so that the shooting lens can capture face images of the user from different angles, where instruction information used for instructing the user to turn the head may be sent by a terminal responsible for controlling the shooting lens, such as a smartphone or a tablet computer with a camera function.

The face reconstruction technology is widely applied to various fields. For example, in the entertainment field, when a user is playing a 3D game, the face model of the user may be reconstructed so that the game character resembles the user, which makes the construction of the 3D game character more personalized.

In some fields represented by the entertainment field above, the face reconstruction technology has the following characteristics: particularly strong precision of the face reconstruction technology is unnecessary for entertainment or the like, and 2D images used for constructing a 3D model are self-photographed and obtained by a user through a terminal. However, the computing and storage capabilities of the terminal are limited, and the face reconstruction technology in the related art requires a large memory space and a high computing capability.

Therefore, to resolve the problem above, the embodiments of this application provide a method for constructing a 3D model of a target object, so that modeling can be performed on obtained 2D images at the terminal to obtain a 3D face model, and the obtained 3D model can be used in a variety of scenarios such as game software, social software and 3D printing. For ease of understanding, the method provided in the embodiments of this application is described in detail below with reference to the accompanying drawings.

Referring to FIG. 1, an embodiment 1 of the method for constructing a 3D model of a target object according to the embodiments of this application includes the following steps:

101: Obtain at least two initial images of a target object from a plurality of shooting angles.

In this embodiment, a specific type of the target object is not limited in the embodiments of this application, which may be a human face, a human body, any part of a human body, or various objects such as a doll or a vehicle. For ease of understanding, a human face is used as an example for detailed description in the following embodiments of this application.

Further, the human face can be photographed through a shooting lens of a terminal. A specific type of the terminal is also not limited in the embodiments of this application, which may be a smartphone, a tablet computer, or the like. The terminal prompts a user to photograph a face from different angles, so as to obtain at least two initial images recorded with the face photographed from different angles. In some embodiments, the initial images may also be obtained by scanning or the like, which is not limited in the embodiments of this application.

Further, the shooting lens needs to have a capability of recording depth information, so that the obtained initial images respectively record depth information of the target object, the depth information being used for recording distances between points of the target object and the shooting lens.

102: Obtain first point cloud information corresponding to the at least two initial images respectively according to depth information in the at least two initial images.

In this embodiment, information of a 2D coordinate is recorded in each pixel of images recorded in the initial images. For example, a coordinate value of a pixel A is (x, y), in combination with the depth information included in the initial images, the coordinate values of the pixel A become a 3D point by using a distance between the pixel A and the lens, and the coordinate value of the 3D point A is (x, y, z). The first point cloud information includes coordinate values used for recording a plurality of 3D points of the target object.

103: Fuse the first point cloud information respectively corresponding to the at least two initial images into second point cloud information.

In this embodiment, each initial image records the corresponding first point cloud information that records 3D points of a human face generated from different shooting angles. After being moved and adjusted to the same angle, the first point cloud information corresponding to the initial images obtained by photographing from different angles are fused to obtain second point cloud information, which can record point cloud information of the target object more precisely.

For example, the target object is a human face. Under the guidance of a terminal, a user photographs a front face, a left face, and a right face, and therefore obtains three initial images. According to step 102 above, the three initial images are processed to obtain first point cloud information of the three images, and the first point cloud information of the three images respectively record point cloud information of the user in states of the front face, the left face, and the right face. After the first point cloud information corresponding to the three images are fused, point cloud information of a full face of the user can be obtained as the second point cloud information.

104: Construct a 3D model of the target object according to the second point cloud information.

In this embodiment, because the second point cloud information has recorded information of 3D coordinates of each point of the target object, the 3D model of the target object can be constructed and obtained according to the second point cloud information.

The method for constructing a 3D model of a target object according to the embodiments of this application includes: obtaining at least two initial images of a target object from different shooting angles; obtaining first point cloud information corresponding to each of the initial images respectively based on depth information in the each initial image; fusing the first point cloud information respectively corresponding to the at least two initial images into second point cloud information; and constructing a 3D model of the target object according to the second point cloud information. Without building an additional storage space, a process of constructing a 3D model can be implemented. The 3D model of the target object is constructed directly in a manner of point cloud fusion, which maximizes the utilization efficiency of a storage space and enables a terminal to efficiently perform a modeling process of face reconstruction.

It is to be noted that, in step 103 above, during fusing the first point cloud information, a known relationship between first point cloud information corresponding to different initial images is necessary for the fusion of the first point cloud information. For ease of understanding, a specific implementation is provided below to resolve the problem.

Figure 2:
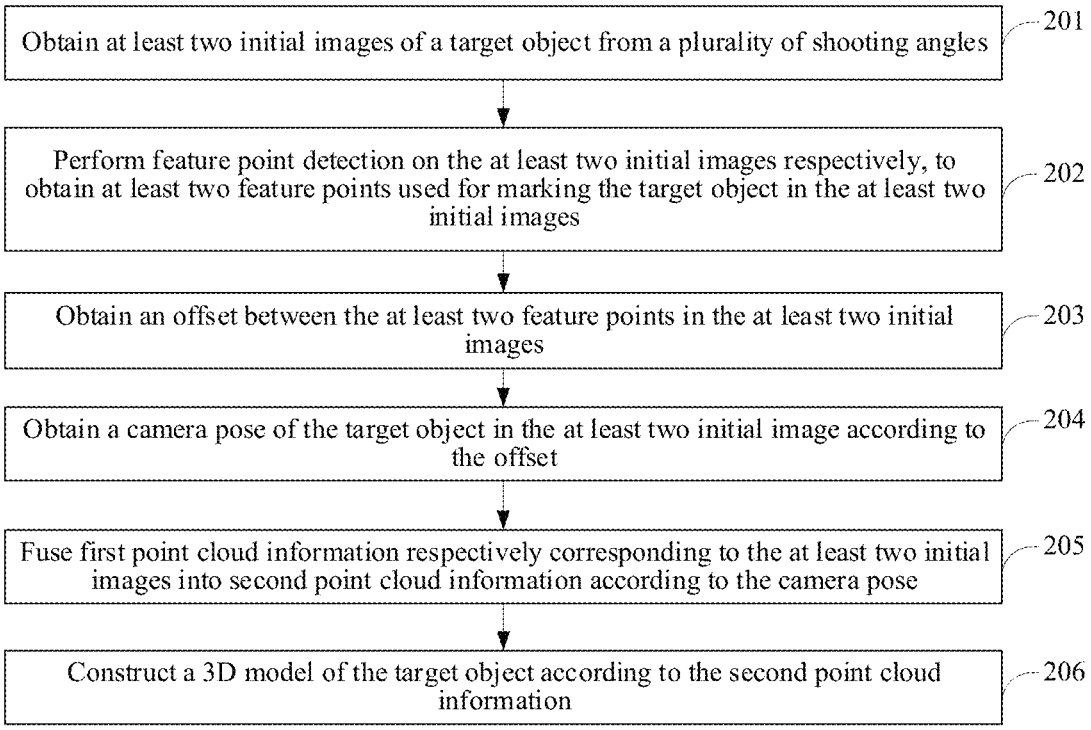
FIG. 2 is a flowchart of another embodiment of a method for constructing a 3D model of a target object according to the embodiments of this application.

Referring to FIG. 2, an embodiment 2 of the method for constructing a 3D model of a target object according to the embodiments of this application includes the following steps:

201: Obtain at least two initial images of a target object from a plurality of shooting angles.

In this embodiment, for the step, reference may be made to step 101 above, which is not repeated herein.

202: Perform feature point detection on the at least two initial images respectively, to obtain at least two feature points used for marking the target object in the at least two initial images.

In this embodiment, the feature point detection may be performed through landmark detection, and specifically, the feature point detection is performed on an initial image through a feature point detection model. The feature point detection model can be obtained through training. For example, feature points in a plurality of human face images are manually marked as a training material, and the feature points such as an eye corner, a nose tip, and a mouth corner in the human face images are marked in the training material. After the feature point detection model is trained by using the training material, the obtained feature point detection model may have a capability of marking the human face images. During inputting an initial image, the feature point detection model may mark feature points, such as an eye corner, a nose tip, and a mouth corner of the human face in the initial image based on a training result. A specific method for training the model above may be any training method in the related art, which is not limited in this application.

After the feature point detection is performed on each initial image, the terminal can perform semantic recognition on different parts of the each initial image according to the marked feature points, so that the terminal can know names of each part of the face image in the each initial image, for example, a position marked by a first feature point A is an eye corner, a position marked by a second feature point B is a nose tip, and a position marked by a third feature point C is a mouth corner.

203: Obtain an offset between the at least two feature points in the at least two initial images.

In this embodiment, the offset is used for identifying a difference in coordinates between the feature points of the target object at the same position in different initial images. For example, in a front face image, a nose tip is marked as a feature point B; and in a left face image, the nose tip is marked as a feature point B'. By calculating an offset between the feature point B and the feature point B', an offset angle used by the user in turning the face to the right for photographing can be known. Further, an offset between other feature points, such as an offset between eye corner feature points, and an offset between mouth corner feature points, may be calculated by using the same method.

204: Obtain a camera pose of the target object in the at least two initial image according to the offset.

In this embodiment, the camera pose is used for representing movement of the target object relative to the shooting lens in different initial images, and the movement includes at least one of rotation and translation. In a specific implementation, a user may obtain the initial images by taking a plurality of 2D photos from different angles under the instruction of a terminal. Because shooting angles are different, angles of the user face relative to the shooting lens in each initial image are different, that is, there are different degrees of rotation or translation relative to the shooting lens. In this regard, the camera pose of the target object may be obtained through an offset calculated and obtained in the previous steps, and the camera pose may be used for representing the change of the target object in different initial images.

In some embodiments, because the method according to the embodiments of this application is mainly used in an entertainment scenario, an initial image is generally photographed and obtained by a user under the instruction of a terminal. For example, the user turns the face relative to a shooting lens at a certain speed, and during the process, the terminal controls the shooting lens to photograph at a preset interval to obtain initial images from different angles. As a non-professional, a speed at which the user turns the face cannot be guaranteed to be stable and linear. It may happen that the user turns the face relatively slowly at a certain angle, resulting in that a plurality of initial images at the same shooting angle are obtained. Therefore, initial images may be screened after the initial images are obtained. A specific implementation is as follows:

Images with a similarity greater than a preset value in the at least two initial images are removed.

In this embodiment, the similarity between the initial images may be determined by camera poses. When a similarity of the camera poses between two initial images is greater than the preset value, it can be determined that shooting angles of the two initial images are relatively close. In this case, one of the initial images is removed to avoid repeated processing on initial images with a similar angle in a subsequent process.

205: Fuse first point cloud information respectively corresponding to the at least two initial images into second point cloud information according to the camera pose.

In this embodiment, first point cloud information corresponding to different initial images are 3D coordinate point sets generated based on different shooting angles. Ideally, for the same target object, 3D coordinate point sets reconstructed based on 2D images photographed from different angles are to be the same. However, in actual working, an error caused by factors, such as a shooting angle or pixel noise results in a certain error between the 3D coordinate point sets generated from different shooting angles. Therefore, it is necessary to fuse the first point cloud information corresponding to different initial images according to the change of the target object in different initial images recorded by the camera pose, so as to obtain second point cloud information closest to an actual situation of the target object.

206: Construct a 3D model of the target object according to the second point cloud information.

In this embodiment, for the step, reference may be made to step 104 above, which is not repeated herein.

In this embodiment, before point cloud fusion is performed, semantics of the initial images are obtained through the feature point detection, so that a machine can obtain a movement relationship between the initial images and generate a camera pose according to detected feature points, then perform the point cloud fusion according to the camera pose, and perform precise fusion on point cloud information generated from different shooting angles according to the relationship obtained by the camera pose.

Further, the embodiments of this application further provide a more detailed implementation to describe a specific process of the point cloud fusion.

Figure 3:
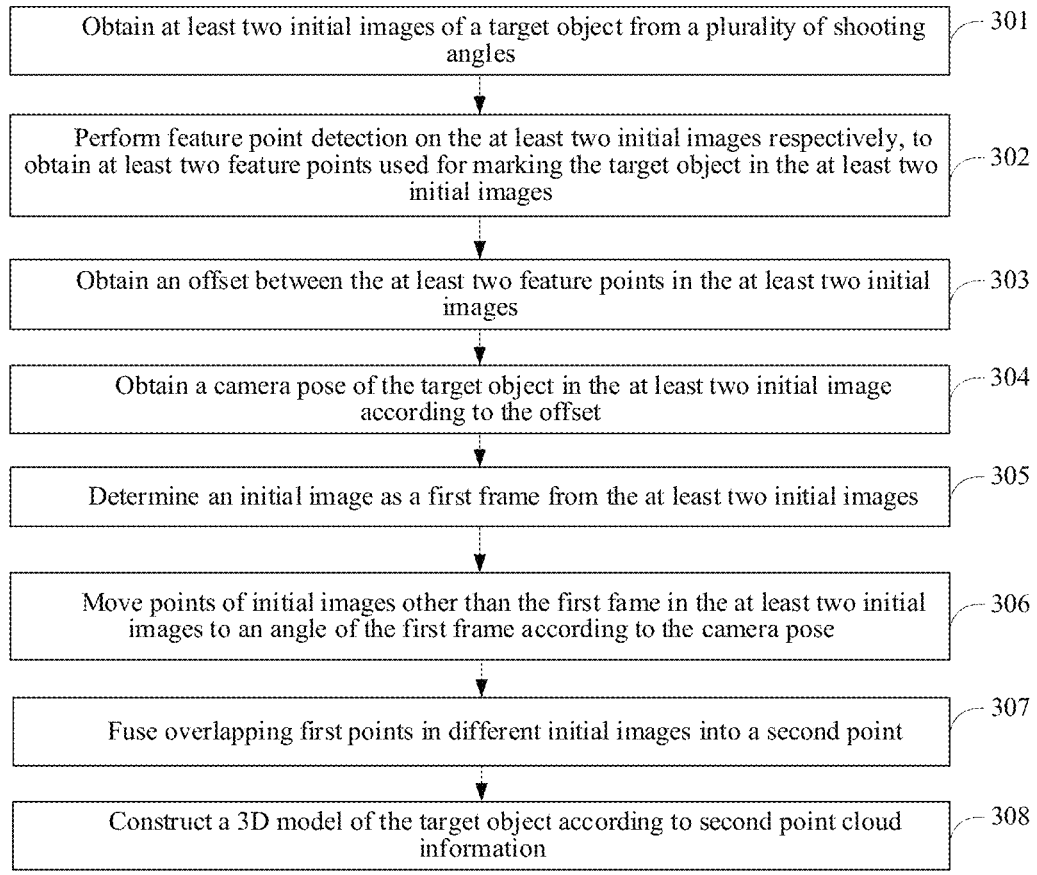
FIG. 3 is a flowchart of another embodiment of a method for constructing a 3D model of a target object according to the embodiments of this application.

Referring to FIG. 3, an embodiment 3 of the method for constructing a 3D model of a target object according to the embodiments of this application includes the following steps:

For steps 301 to 304, reference may be made to steps 201 to 204 above, which are not repeated herein.

305: Determine one initial image as a first frame from the at least two initial images.

In this embodiment, one of the at least two initial images obtained is determined as the first frame. For example, from a front face image, a left face image, and a right face image, the front face image is determined as the first frame. The first frame may be regarded as an initial reference point.

306: Move points of initial images other than the first frame in the at least two initial images to an angle of the first frame according to the camera pose.

In this embodiment, different initial images respectively have corresponding first point cloud information. For example, the front face image (the first frame) generates point cloud information A, the left face image generates point cloud information B, and the right face image generates point cloud information C. According to the camera pose, the left face image is photographed from a shooting angle when the front face is turned by 90° to the right, and the right face image is photographed from a shooting angle when the front face is turned by 90° to the left. In this step, point cloud information corresponding to the left face image and the right face image need to be moved: the point cloud information B of the left face image is rotated by 90° to the left, and the point cloud information C of the right face image is rotated by 90° to the right, so that all points corresponding to the left face image and the right face image are moved to the front face image (an angle of the first frame).

307: Fuse overlapping first points in different initial images into a second point.

In this embodiment, the first point is a point in the first point cloud information, and the second point is a point in the second point cloud information. Each point in the first point cloud information is fused respectively to obtain the second point cloud information. For example, in the front face image, there is a 3D point A1 at a nose tip of a user, and a coordinate value is (x1, y1, z1); in the left face image, there is a 3D point B1 at the nose tip of the user, and a coordinate value is (x2, y2, z2); and in the right face image, there is a 3D point C1 at the nose tip of the user, and a coordinate value is (x3, y3, z3). After the left face image and the right face image are moved according to step 306 above, three 3D points A1, B1 and C1 overlap with each other. In this case, fusion on A1, B1, and C1 is performed to obtain a 3D point D1 (x4, y4, z4), which is a 3D point at the nose tip of the user in the second point cloud information.

It is to be noted that, in the working process above, due to factors such as a shooting angle of the initial images, which may cause image noise, the three 3D points A1, B1, and C1 above cannot completely overlap. Therefore, it is necessary to assign different weights to A1, B1, and C1 according to the weights, which specifically includes the following steps:

1: Assign Different Weights to the First Points in the at Least Two Initial Images.

In this embodiment, for example, the initial images include three images: a front face image, a left face image, and a right face image. Each of the three images includes a point used for representing a nose tip of a user (for example, the nose tip is a first point). In this case, during point fusion, different weights need to be assigned to points from different images. In some embodiments, weight values may be assigned to first points according to at least one of a shooting angle, an image noise value, or a normal direction of the initial image in which the first point is located. For example, a shooting angle of the front face image is the most positive, and has a higher precision among the nose tip points. Therefore, a weight assigned to the first point of the front face image is 60%, and weights assigned to the first points of the left face image and the right face image are respectively 20%.

2: Fuse overlapping first points into a second point according to the weights.

In this embodiment, as in the example above, the weight assigned to the first point of the front face image is 60%, and the weights assigned to the first points of the left face image and the right face image are respectively 20%. Therefore, in 3D coordinates of a second point D1 obtained after fusion: x4=(x1*60%+x2*20%+x3*20%)/3; y4=(y1*60%+y2*20%+y3*20%)/3; and z4=(z1*60%+z2*20%+z3*20%)/3. Therefore, according to different weights, 3D points from different initial images can be more precisely fused.

Figure 4:
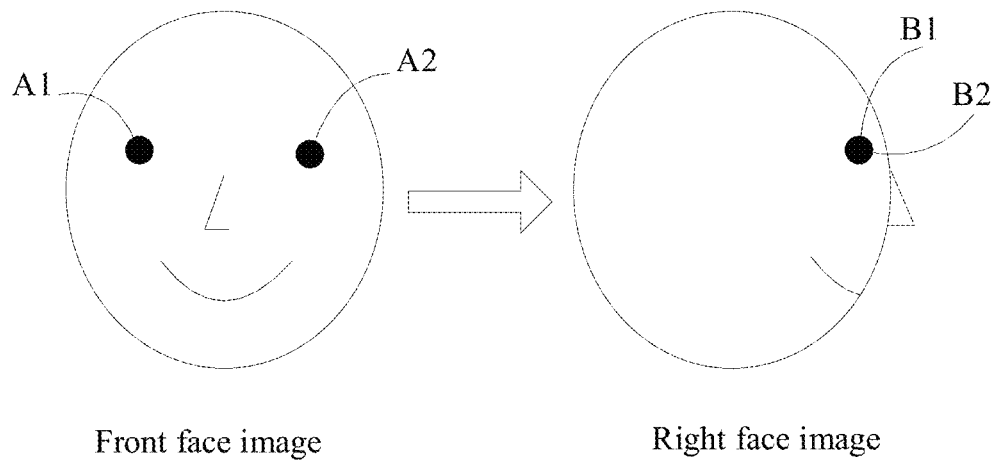
FIG. 4 is a schematic diagram of an embodiment of a method for constructing a 3D model of a target object according to the embodiments of this application.

It is to be noted that, in the point cloud fusion process above, there may be a special situation. Referring to FIG. 4, the front face image of the user includes two 3D points: a right eye corner A1 and a left eye corner A2; in the right face image, because the user has turned the face 90° to the left, a 3D point B1 used for representing the right eye corner and a 3D point B2 used for representing the left eye corner are overlapped in the right face image, which causes a problem, that is, the machine cannot distinguish between two points B1 and B2, and therefore cannot determine which of the two points B1 and B2 is to be fused with the point A1. In this regard, in response to such a problem, the embodiments of this application provide the following steps:

Obtain a first point having a smaller absolute value of a depth difference with a first point in the first frame from a first initial image to perform point cloud fusion with the first point in the first frame.

In this embodiment, the two points B1 and B2 only overlap on two coordinate values x and y, and z coordinate values used for representing depth information of the two are different. For example, a coordinate value of B1 is (x1, y1, Z1), and a coordinate value of B2 is (x2, y2, z2). When the two points B1 and B2 overlap in an initial image, x1=x2, and y1=y2, but z1≠z2; and a coordinate of the point A1 is (x3, y3, z3). In this case, a difference is made to the z coordinates including the depth information, and D1=|z3−z1| and D2=|z3-z2| are obtained. Because the point B1 and the point A1 are actually coordinate points both used for representing the right eye, an ordinate distance between the two is closer, and D1<D2 can be obtained, so that it can be obtained that B1 is the point that is to be fused with A1.

308: Construct a 3D model of the target object according to the second point cloud information.

In this embodiment, for the step, reference may be made to step 104 above, which is not repeated herein.

In this embodiment, effective point clouds in each initial image are projected to a reference coordinate system (a camera coordinate system in which the first frame is located), and then weighted fusion is performed on points in an overlapping area to obtain the second point cloud information more precisely, so that a more precise 3D model is constructed.

It is to be noted that, after the second point cloud information is obtained, further processing needs to be performed on the second point cloud information to obtain the 3D model of the target object. The embodiments of this application provide a specific implementation for obtaining the 3D model of the target object according to the second point cloud information, which is described in detail below with reference to the accompanying drawings for ease of understanding.

Figure 5A:
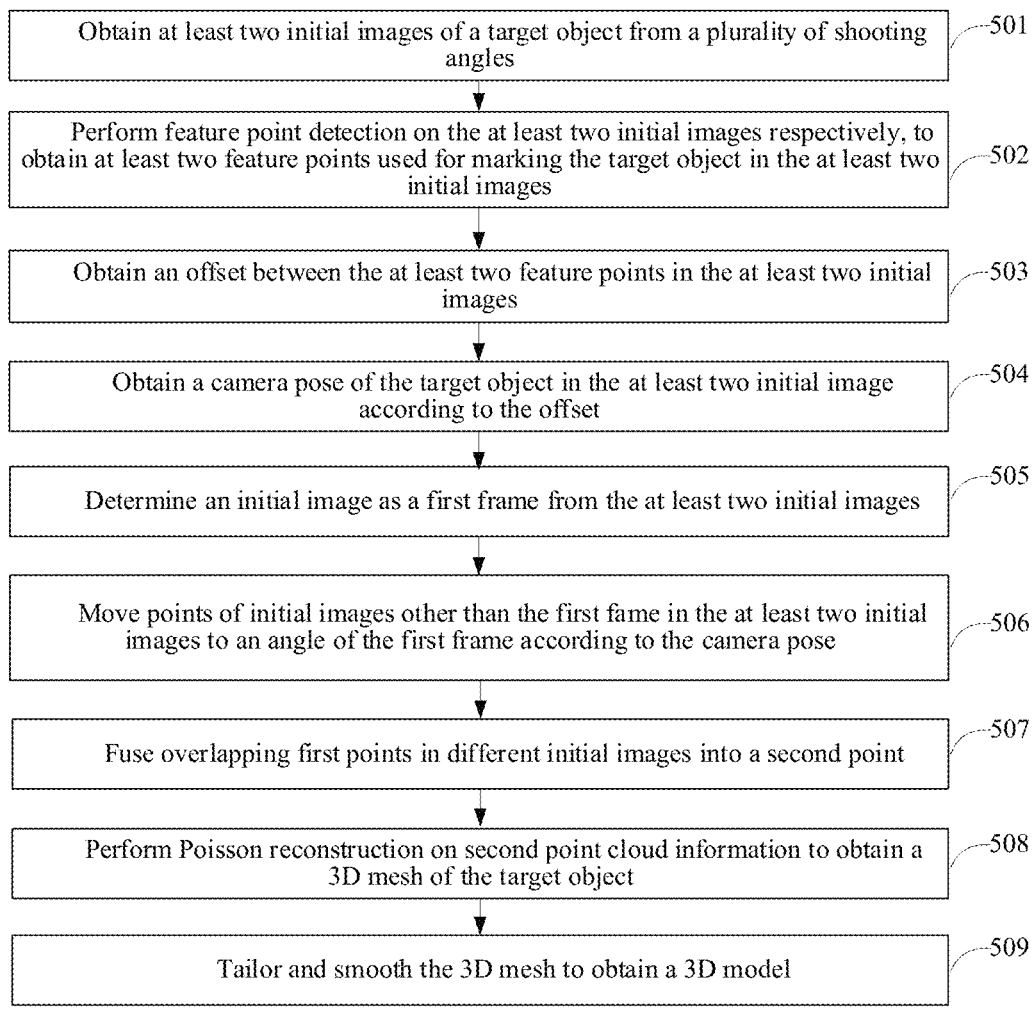
FIG. 5a is a flowchart of another embodiment of a method for constructing a 3D model of a target object according to the embodiments of this application.

Referring to FIG. 5*a*, an embodiment 4 of the method for constructing a 3D model of a target object according to the embodiments of this application includes the following steps:

For steps 501 to 507, reference may be made to steps 301 to 307 above, which are not repeated herein.

508: Perform Poisson reconstruction on the second point cloud information to obtain a 3D mesh of the target object.

In this embodiment, the 3D mesh is a non-porous surface connecting points in the second point cloud information. The Poisson reconstruction used in the technical solutions according to this application is a Poisson reconstruction technology in the related art, which is not limited in the embodiments of this application. An objective of the Poisson reconstruction is to generate a watertight non-porous surface. When Poisson reconstruction is performed to construct a Poisson equation, the input is a point cloud and a corresponding normal, and the point cloud comes from a result of direct fusion in the previous step. According to a consistency principle of normal directions, a normal is extracted directly from a depth image of a selected frame. That is, the depth image is regarded as a Z (x,y) function.

In some embodiments, the Poisson reconstruction may be achieved by the following formula.

$$dzdx=(z(x+1,y)-z(x-1,y))/2.0; \quad \text{(formula 1)}$$

$$dzdy=(z(x,y+1)-z(x,y-1))/2.0; \quad \text{(formula 2)}$$

$$\text{direction}=(dxdz,-dydz,1.0); \quad \text{(formula 3)}$$

$$\text{magnitude}=\text{sqrt}(\text{direction}.x^{}2+\text{direction}.y^{}2+\text{direction}.z^{**}2) \quad \text{(formula 4)}$$

$$\text{normal}=\text{direction}/\text{magnitude} \quad \text{(formula 5)}$$

In the formulas above, x, y, and z are respectively an abscissa, an ordinate, and a depth coordinate of each 3D point, direction is a normal direction, and magnitude is a size of a normal vector. As shown in formula 5, a normal finally obtained is equal to the normal direction divided by a size of the normal, that is, a modulus of the normal. Therefore, the normal is extracted.

509: Tailoring and smooth the 3D mesh to obtain the 3D model.

In this embodiment, the 3D mesh obtained by the Poisson reconstruction already has a prototype of the 3D model. In this case, the 3D mesh may include shapes of some backgrounds, and there are some unevenness on a surface of the 3D mesh of a human face. Therefore, the 3D mesh requires post-processing, and steps of the post-processing include tailoring and smoothing. In some embodiments, the post-processing may specifically include the following steps:

1: Project the 3D mesh in a direction perpendicular to a lens surface according to feature points to obtain a first projection plane.

In this embodiment, the first projection plane may be obtained by projecting points in the 3D mesh along a z-axis direction.

2: Connect the feature points to form a convex hull in the first projection plane, and obtain an area in which the convex hull is located as a second projection plane.

In this embodiment, the convex hull is a concept in computational geometry (graphics). In a real vector space V, for a given set X, an intersection S of all convex sets including X is called a convex hull of X. The convex hull of X may be constructed by a convex combination of all points (X1, ... Xn) in X. In a 2D Euclidean space, the convex hull may be imagined as a rubber ring exactly covering all points. The convex hull is constructed by connecting the feature points. Because only a human face can have a curved surface capable of constructing a convex hull, an area in which the human face is located and a background area can be distinguished in this way, so that the second projection plane finally obtained is the area in which the human face is located.

3: Tailor the 3D mesh according to the second projection plane to remove a 3D mesh that is not the target object.

In this embodiment, according to the second projection plane, a part other than the second projection plane in the 3D mesh is removed, so as to implement tailoring, remove the 3D mesh that is not the target object, and obtain a 3D mesh with only the area of the human face.

4: Smooth a tailored 3D mesh to obtain the 3D model.

In this embodiment, after the smoothing is completed, the 3D model of the target object can be obtained. In some embodiments, the smoothing may be implemented through smoothing of the HC Laplacian Smooth.

Figure 5C:
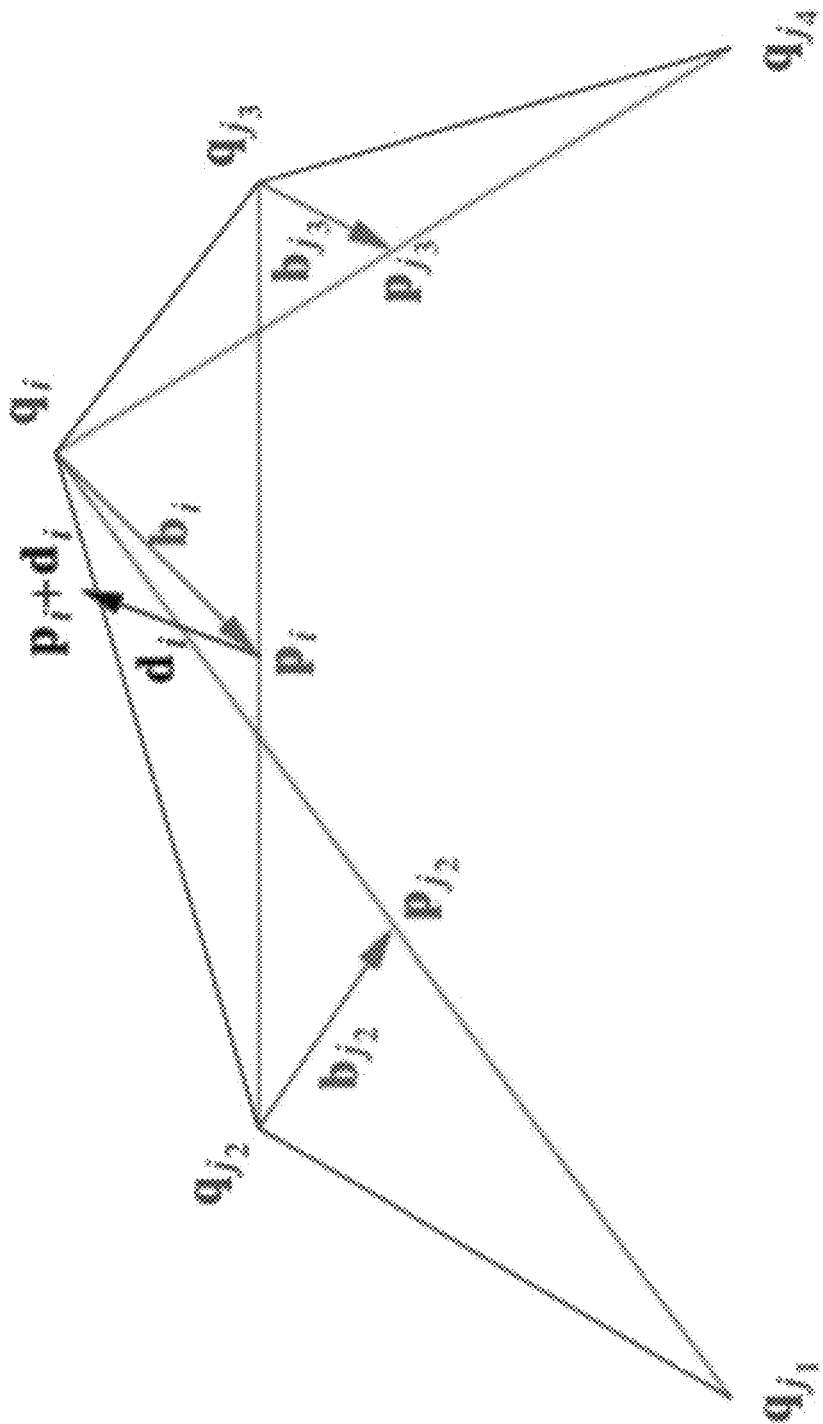
FIG. 5c is a schematic diagram of smoothing in a method for constructing a 3D model of a target object according to the embodiments of this application.

In some embodiments, the smoothing may be implemented by an algorithm of the HC Laplacian Smooth shown in FIG. 5b. As shown in FIG. 5b, as a preferred implementation, in order to retain more details, an impact factor 1 is set to 0.0, and an impact factor 2 is set to 0.9. An algorithm idea shown in FIG. 5b is: selecting an original point and a point connected to the original point, and obtaining a new point through a preset rule and weighted average to replace the original point. In FIG. 5b, p and o both represent the original point. Through "p:=o", a coordinate value of o is assigned to p, and then subsequent code is executed through a "repeat" loop, and through "q:=p", a coordinate value represented by p is assigned to q; i represents a certain vertex (that is, a vertex to be smoothed in the table below), Vear represents all vertices, "for all i∈Vear do" represents that a subsequent formula is executed for all vertices to be smoothed, n represents the number of vertices connected to a vertex i, Adj represents an adjacent point, "if n≠0 then" represents that when the number of vertices connected to the vertex i is not 0, a subsequent algorithm is executed, and pi represents an average point, that is, a result obtained when all adjacent points connected to the vertex i are weighted averaged. By introducing two parameters α and β, a smoothed model can be prevented from shrinking and a balance effect can be converged. A role of bi is to determine a direction, that is, a direction closer to the original point, and bi may be understood as a connection line between qi and pi, whose length is determined by α. di is determined by a weighted average of bi of all adjacent points, that is, the effect is determined by β, and each original point has a corresponding bi. As shown in FIG. 5c, after a process of an algorithm in FIG. 5b is performed, two points qj2 and qj3 are respectively smoothed, and two smoothed points pj2 and pj3 are obtained. A connection line of qj1, pj2, qi, pj3 and qj4 obtained is a smoothed curve.

In the steps above, the post-processing is performed on the second point cloud information obtained after the fusion to obtain a tailored and smoothed 3D model, so that the reconstruction of the 3D model of the target object is completed.

It is to be noted that the method for constructing a 3D model of a target object according to the embodiments of this application may be implemented according to the Surfel model. The method for constructing a 3D model of a target object is described in detail below with reference to a specific usage scenario.

Figure 6:
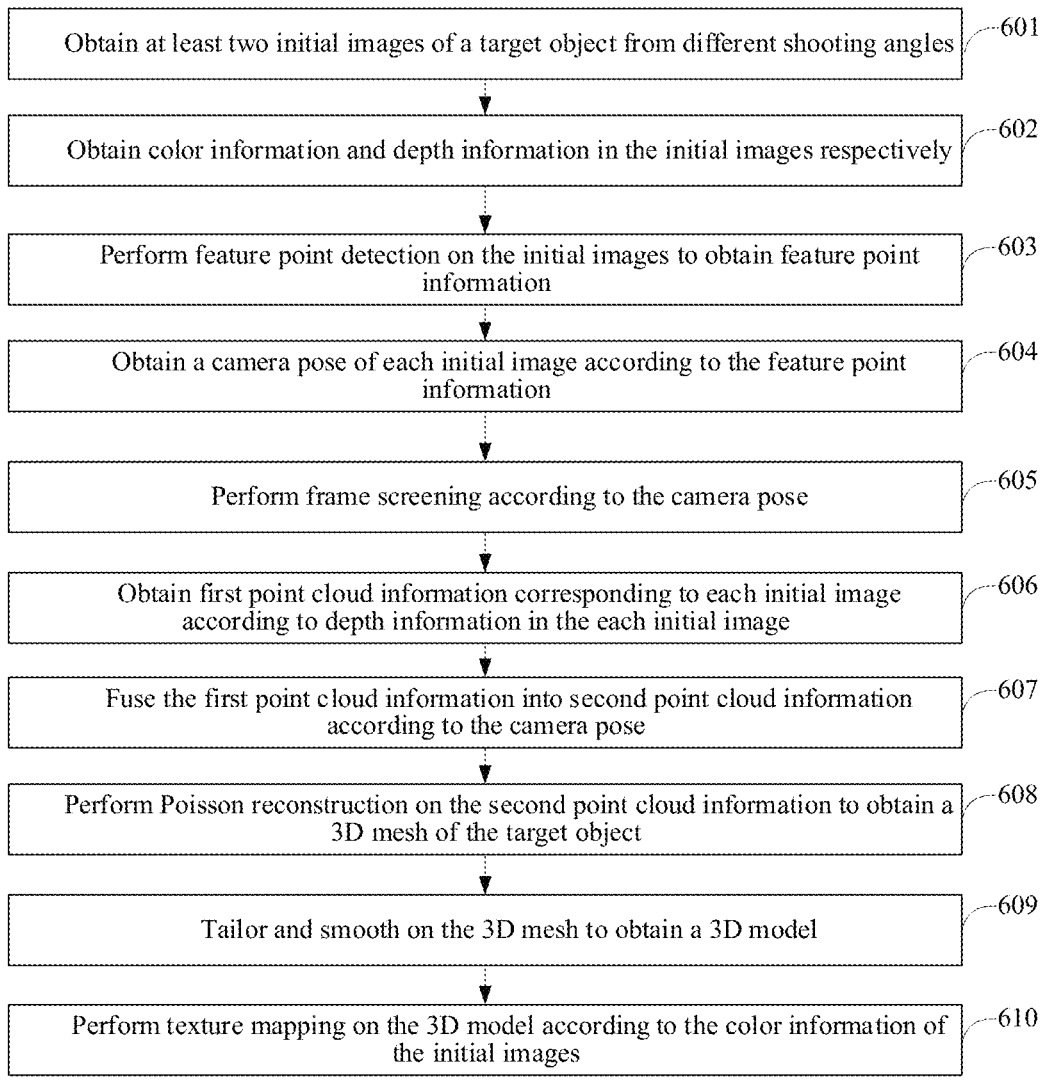
FIG. 6 is a flowchart of another embodiment of a method for constructing a 3D model of a target object according to the embodiments of this application.

Referring to FIG. 6, an embodiment 5 of the method for constructing a 3D model of a target object according to the embodiments of this application includes the following steps:

601: Obtain at least two initial images of a target object from different shooting angles.

Figure 7:
FIG. 7 is a schematic diagram of initial images in a method for constructing a 3D model of a target object according to the embodiments of this application.

In this embodiment, for a specific implementation of this step, reference may be made to step 101 above, which is not repeated herein. Referring to FIG. 7, a user takes 8 photos from different angles under the guidance of a terminal, so that 8 initial images from different shooting angles are obtained.

602: Obtain color information and depth information in the initial images respectively.

In this embodiment, the color information comes from RGB information in images recorded by a shooting lens, and the shooting lens has a capability of recording depth information, for example, may be a depth camera—so that the initial images further include the depth information of the images. For the 8 initial images obtained above, color information and depth information thereof are obtained respectively.

603: Perform feature point detection on the initial images to obtain feature point information.

In this embodiment, for the step, reference may be made to step 202 above, which is not repeated herein. Through the feature point detection, a plurality of feature points 701 of a human face in the 8 initial images shown in FIG. 7 are marked as the feature point information.

604: Obtain a camera pose of each initial image based on the feature point information.

In this embodiment, an offset of each feature point is obtained according to the feature points, and then a camera pose of the target object in each initial image is obtained according to the offset. For a specific implementation, reference may be made to steps 203 to 204 above, which are not repeated herein.

605: Perform frame screening according to the camera pose.

In this embodiment, the camera pose indicates a shooting angle of the target object in each initial image. According to the camera pose, initial images with a similar shooting angle can be screened out and removed to avoid repeated processing on the initial images with the similar shooting angle, so that a working process of frame screening is implemented. For a detailed working step, reference may be made to related description of step 204, which is not repeated herein.

606: Obtain first point cloud information corresponding to each initial image according to depth information in the each initial image.

In this embodiment, the depth information is back-projected to obtain 3D point information of the target object, that is, the first point cloud information. For a specific step, reference may be made to step 102 above, which is not repeated herein.

607: Fuse the first point cloud information into the second point cloud information according to the camera pose.

Figure 8:
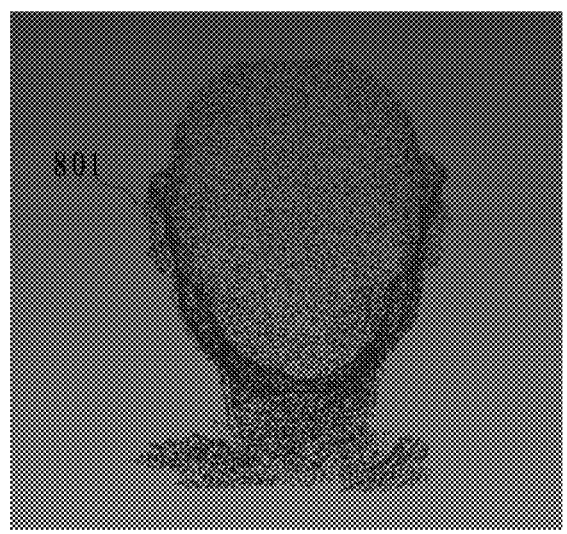
FIG. 8 is a schematic diagram of second point cloud information in a method for constructing a 3D model of a target object according to the embodiments of this application.

In this embodiment, for a detailed implementation for performing point cloud fusion, reference may be made to steps 305 to 307 above, which are not repeated herein. After the point cloud fusion is completed, the second point cloud information obtained is shown in FIG. 8. The second point cloud information includes a plurality of 3D points 801, and each 3D point 801 is the second point in step 307 above.

608: Perform Poisson reconstruction on the second point cloud information to obtain a 3D mesh of the target object.

Figure 9:
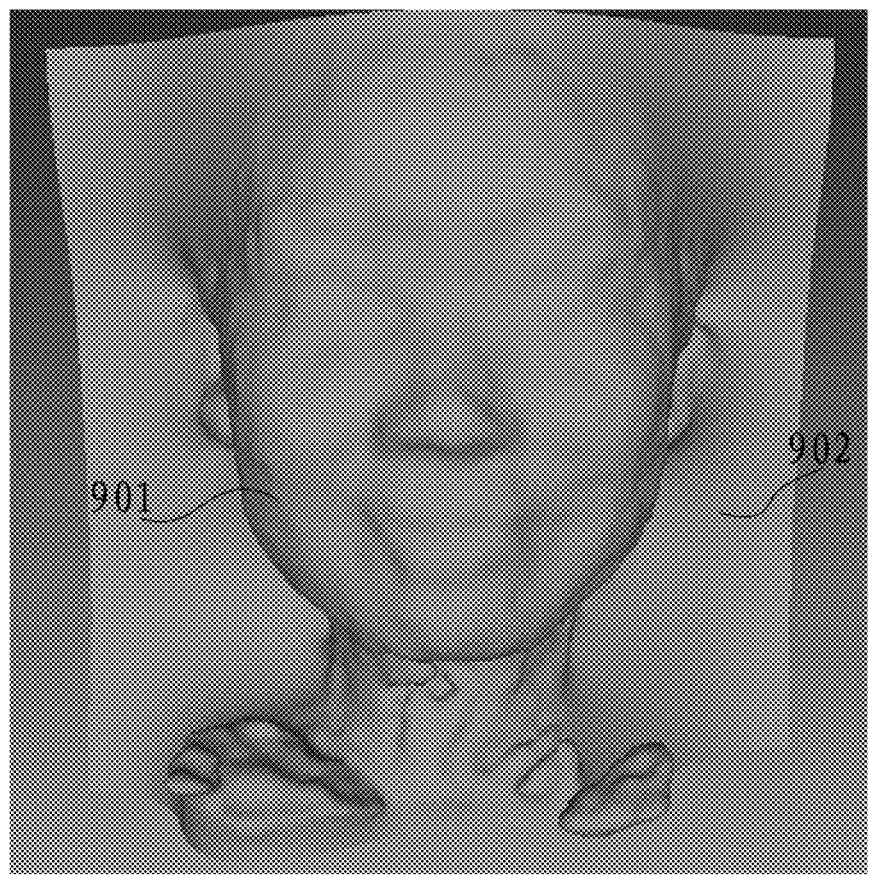
FIG. 9 is a schematic diagram of a 3D mesh in a method for constructing a 3D model of a target object according to the embodiments of this application.

In this embodiment, for a specific implementation of this step, reference may be made to step 508 above, which is not repeated herein. Referring to FIG. 9, after the Poisson reconstruction is completed, a 3D mesh shown in FIG. 9 is obtained, and the 3D mesh includes a human face part 901 and a background part 902.

609: Tailor and smooth the 3D mesh to obtain the 3D model.

Figure 10:
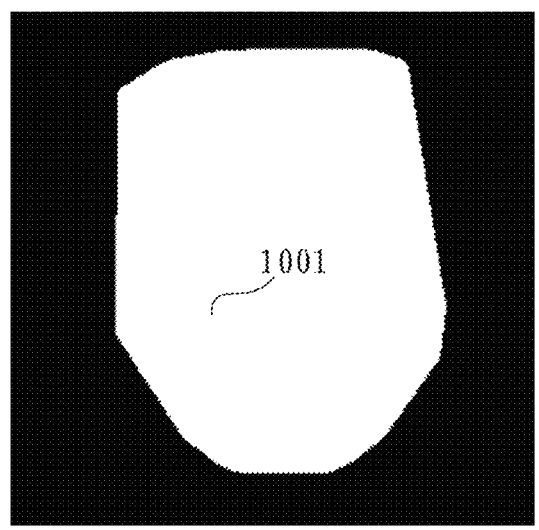
FIG. 10 is a schematic diagram of a second projection plane in a method for constructing a 3D model of a target object according to the embodiments of this application.
Figure 11:
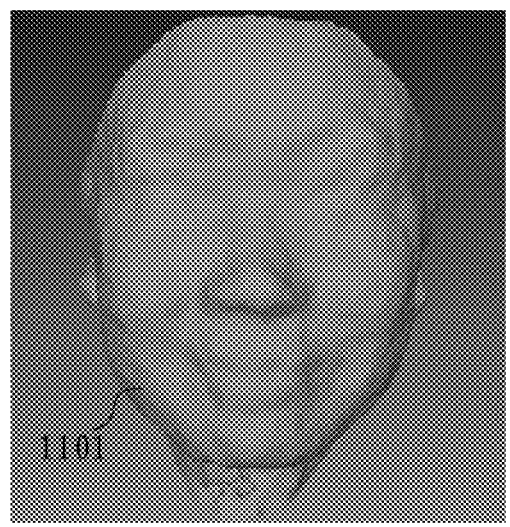
FIG. 11 is a schematic diagram of a tailored 3D mesh in a method for constructing a 3D model of a target object according to the embodiments of this application.

In this embodiment, for a specific implementation of this step, reference may be made to step 509 above, which is not repeated herein. It is to be noted that, in a process of tailoring, the 3D mesh is projected in a direction perpendicular to a lens surface according to the feature points to obtain a first projection plane, then the feature points are connected to form a convex hull in the first projection plane, and an area in which the convex hull is located is obtained as a second projection plane. The second projection plane obtained is shown in FIG. 10, and 1001 in FIG. 10 is the second projection plane on which the human face is located. Then, the 3D mesh is tailored according to the second projection plane to remove a 3D mesh that is not the target object, that is, the background part 902 in FIG. 9, so that the human face part 901 is retained and a 3D mesh including only a human face 1101 shown in FIG. 11 is obtained. Finally, the 3D mesh is smoothed, and a 3D model about a human face 1201 shown in FIG. 12 is obtained.

610: Perform texture mapping on the 3D model based on the color information of the initial images.

Figure 13:
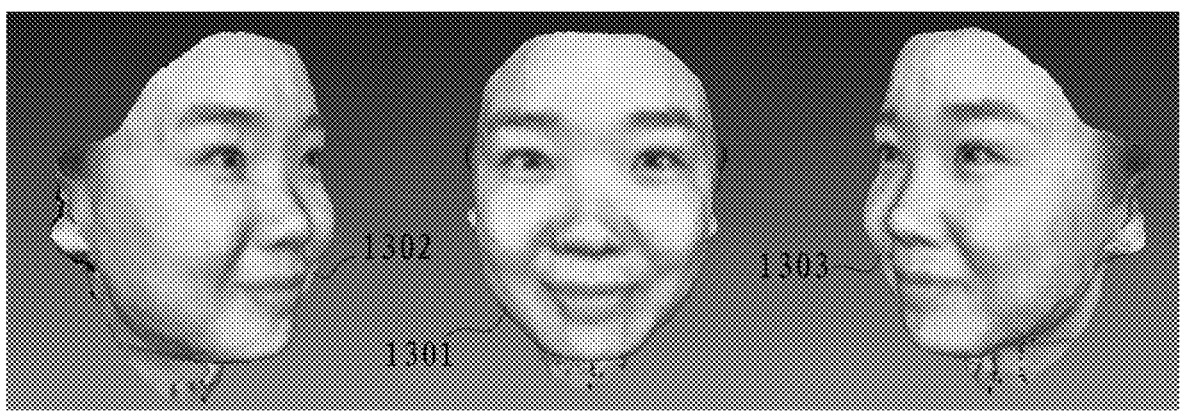
FIG. 13 is a schematic diagram of a 3D model in a method for constructing a 3D model of a target object according to the embodiments of this application.

In this embodiment, the 3D model obtained in step 609 above is a model with only a shape of a human face, which does not include the color information. In this step, the texture mapping is performed on the obtained 3D model by using the color information obtained from the initial images, so that the 3D model includes the color information, and a 3D face model with texture color information shown in FIG. 13 is obtained. The 3D model may be rotated arbitrarily. FIG. 13 shows a front view 1301, a right view 1302, and a left view 1303 of the 3D model. A specific implementation of the texture mapping above is any implementation in the related art, which is not specifically described in the embodiments of this application.

Figure 12:
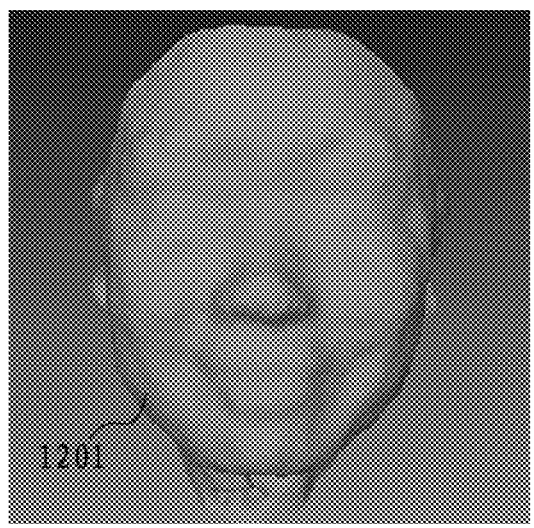
FIG. 12 is a schematic diagram of a 3D model in a method for constructing a 3D model of a target object according to the embodiments of this application.

In this embodiment, in the method provided in the embodiments of this application, a 3D model shown in FIG. 12 is finally obtained based on initial images in FIG. 7, and a 3D model shown in FIG. 13 is obtained after the texture mapping is performed, so that the reconstruction of the 3D model based on 2D images is implemented.

The method for constructing a 3D model of a target object according to the embodiments of this application includes: obtaining at least two initial images of a target object from different shooting angles; obtaining first point cloud information corresponding to each of the initial images respectively based on depth information in the each initial image; fusing the first point cloud information respectively corresponding to the at least two initial images into second point cloud information; and constructing a 3D model of the target object according to the second point cloud information. Without building an additional storage space, a process of constructing a 3D model can be implemented. The 3D model of the target object is constructed directly in a manner of point cloud fusion, which maximizes the utilization efficiency of a storage space and enables a terminal to efficiently perform a modeling process of face reconstruction.

The solutions provided in the embodiments of this application are described above. It may be understood that, to implement the foregoing functions, a computer device is provided, including corresponding hardware structures and/or software modules for performing the functions. A person skilled in the art may easily realize that, with reference to modules and algorithm steps described in the embodiments disclosed by this specification, this application can be implemented by using hardware or a combination of hardware and computer software. Whether a function is performed by hardware or hardware driven by computer software depends on particular applications and design constraint conditions of the technical solutions. A person skilled in the art may use different methods to implement the described functions for each particular application, but it is not to be considered that the implementation goes beyond the scope of this application.

In regard to a hardware structure, the method above may be implemented by a physical device, by a plurality of physical devices, or by a logical function module in a physical device, which is not specifically limited in the embodiments of this application.

Figure 14:
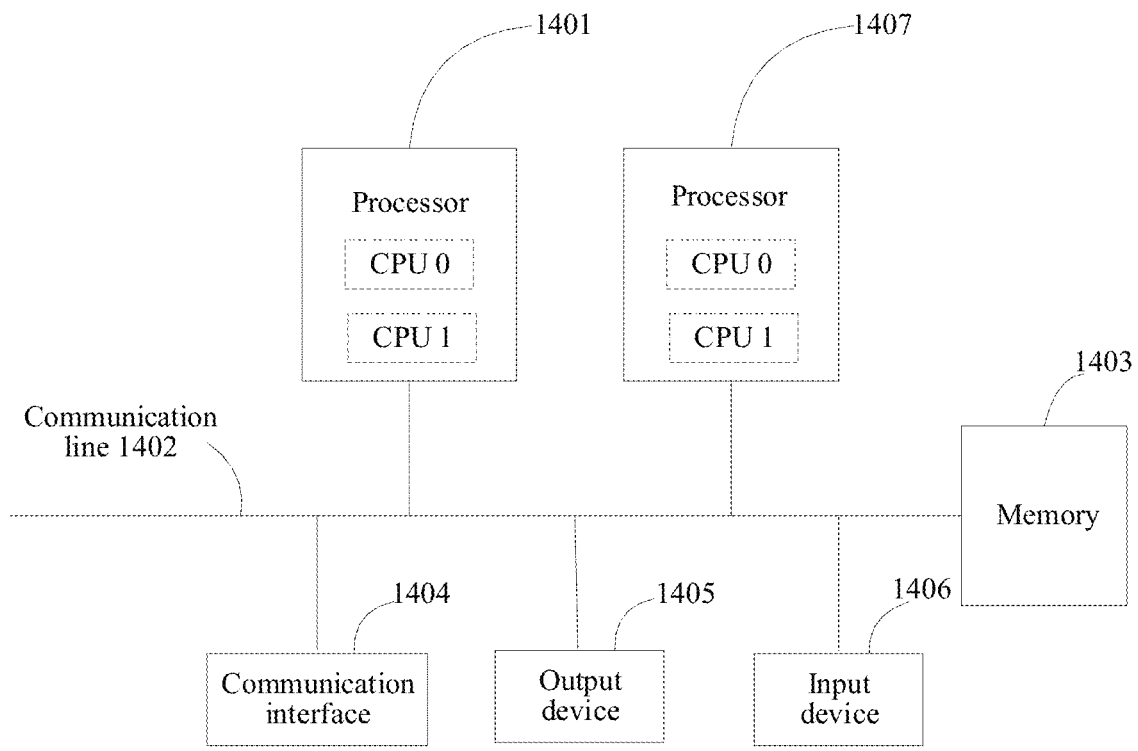
FIG. 14 is a schematic diagram of a computer device according to the embodiments of this application.

For example, the method above may all be implemented by a computer device in FIG. 14. FIG. 14 is a schematic diagram of a hardware structure of a computer device according to the embodiments of this application. The computer device includes at least one processor 1401, a communication line 1402, a memory 1403, and at least one communication interface 1404.

The processor 1401 may be a general-purpose central processing unit (CPU), a microprocessor, an application-specific integrated circuit (a server IC), or one or more integrated circuits configured to control the program execution of the solutions of this application.

The communication line 1402 may include a channel for transmitting information between the foregoing components.

The communication interface 1404 uses any apparatus such as a transceiver to communicate with another device or communication network, such as an Ethernet, a radio access network (RAN), or a wireless local area network (WLAN).

The memory 1403 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or another optical disk storage, optical disc storage (including a compact disc, a laser disc, an optical disc, a digital versatile disc, a Blu-ray disc, or the like) and a disk storage medium or another magnetic storage device, or any other medium that can be used to carry or store expected program code in an instruction or data structure form and that can be accessed by a computer, but is not limited thereto. The memory may exist independently, and is connected to the processor through the communication line 1402. Alternatively, the memory may be integrated with the processor.

The memory 1403 is configured to store computer execution instructions for performing the solutions of this application, and is controlled and executed by the processor 1401. The processor 1401 is configured to execute the computer execution instructions stored in the memory 1403 to implement the method provided in the above embodiments of this application.

In some embodiments, the computer execution instructions in the embodiments of this application may also be referred to as application program code, which is not specifically limited in the embodiments of this application.

In a specific implementation, as an embodiment, the processor 1401 may include one or more CPUs, such as a CPU 0 and a CPU 1 in FIG. 14.

In a specific implementation, as an embodiment, the computer device may include a plurality of processors, such as a processor 1401 and a processor 1407 in FIG. 14. Each of the processors may be a single-CPU processor or a multi-CPU processor. The processor herein may refer to one or more devices, circuits, and/or processing cores for processing data (for example, computer program instructions).

In a specific implementation, as an embodiment, the computer device may further include an output device 1405 and an input device 1406. The output device 1405 communicates with the processor 1401 and may display information in a variety of ways. For example, the output device 1405 may be a liquid crystal display (LCD), a light emitting diode (LED) display device, a cathode ray tube (CRT) display device, a projector, or the like. The input device 1406 communicates with the processor 1401, and may receive user input in a variety of ways. For example, the input device 1406 may be a mouse, a keyboard, a touch screen device, a sensor device, or the like.

The computer device may be a general-purpose device or a special-purpose device. In a specific implementation, the computer device may be a desktop computer, a portable computer, a network server, a personal digital assistant (PDA), a mobile phone, a tablet computer, a wireless terminal device, an embedded device, or a device with a similar structure in FIG. 14. The type of the computer device is not limited in the embodiments of this application.

The storage device may be divided into functional units according to the foregoing method and examples in the embodiments of this application, for example, may be divided according to functions, or two or more functions may be integrated into one processing unit. The integrated unit may be implemented in the form of hardware, or may be implemented in a form of a software functional unit. It is to be noted that the division of units in the embodiments of this application is illustrative, which is only a logical function division, and there may be other division manners in actual implementation.

Figure 15:
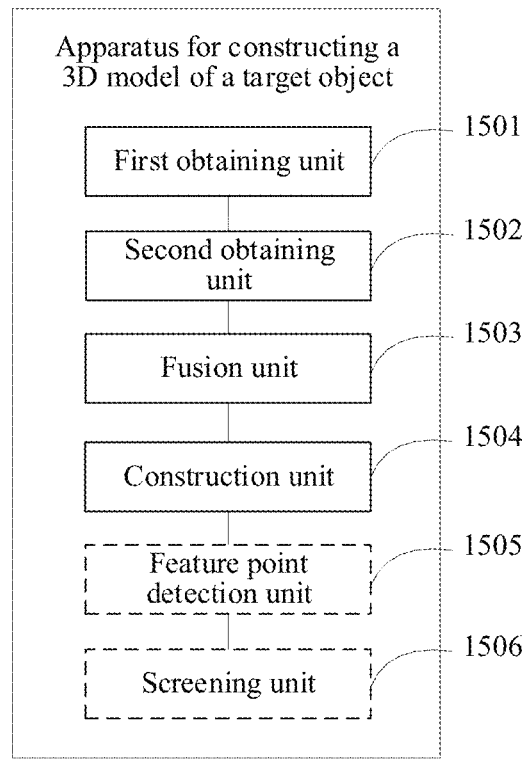
FIG. 15 is a schematic diagram of an apparatus for constructing a 3D model of a target object according to the embodiments of this application.

For example, when the division into the functional units is in an integrated manner, FIG. 15 shows a schematic diagram of an apparatus for constructing a 3D model of a target object.

As shown in FIG. 15, the apparatus for constructing a 3D model of a target object according to the embodiments of this application includes:

a first obtaining unit 1501, configured to obtain at least two initial images of a target object from a plurality of shooting angles, the at least two initial images respectively recording depth information of the target object, and the depth information being used for recording distances between a plurality of points of the target object and a reference position;

a second obtaining unit 1502, configured to obtain first point cloud information corresponding to the at least two initial images respectively according to the depth information in the at least two initial images obtained by the first obtaining unit 1501;

a fusion unit 1503, configured to fuse the first point cloud information respectively corresponding to the at least two initial images obtained by the second obtaining unit 1502 into second point cloud information; and a construction unit 1504, configured to construct a 3D model of the target object according to the second point cloud information obtained by the fusion unit 1503.

In some embodiments, the apparatus further includes a feature point detection unit 1505, and the feature point detection unit 1505 is configured to:

perform feature point detection on the at least two initial images respectively to obtain at least two feature points used for marking the target object in the at least two initial images, the at least two feature points being used for identifying feature points of the target object at the same position in the at least two initial images respectively;

obtain an offset between the at least two feature points in the at least two initial images, the offset being used for identifying a difference in coordinates between the feature points of the target object at the same position in different initial images; and obtain a camera pose of the target object in the at least two initial images according to the offset, the camera pose being used for representing movement of the target object relative to the reference position in different initial images, the movement including at least one of rotation and translation, and the reference position being a position at which a shooting lens used for photographing the target object is located.

The fusion unit 1503 is further configured to:

fuse the first point cloud information respectively corresponding to the at least two initial images into the second point cloud information according to the camera pose.

In some embodiments, the fusion unit 1503 is further configured to:

determine one initial image as a first frame from the at least two initial images;

move points of initial images other than the first frame in the at least two initial images to an angle of the first frame according to the camera pose; and fuse overlapping first points in different initial images into a second point, the first point being a point in the first point cloud information, and the second point being a point in the second point cloud information.

In some embodiments, the fusion unit 1503 is further configured to:

assign different weights to the first points in different initial images; and fuse the overlapping first points into the second point according to the weights.

In some embodiments, the fusion unit 1503 is further configured to:

assign weight values to the first points according to at least one of a shooting angle, an image noise value, or a normal direction of initial images in which the first points are located.

In some embodiments, the fusion unit 1503 is further configured to:

obtain, when there are two overlapping first points in a first initial image, a first point having a smaller absolute value of a depth difference with a first point in the first frame from the first initial image, to perform point cloud fusion with the first point in the first frame, so as to obtain the second point, the first initial image being an image other than the first frame in the at least two initial images.

In some embodiments, the construction unit 1504 is further configured to:

perform Poisson reconstruction on the second point cloud information to obtain a 3D mesh of the target object, the 3D mesh being a non-porous surface connecting points in the second point cloud information; and tailor and smooth the 3D mesh to obtain the 3D model.

In some embodiments, the construction unit 1504 is further configured to:

project the 3D mesh in a direction perpendicular to a lens surface according to the feature points to obtain a first projection plane;

connect the feature points to form a convex hull in the first projection plane, and obtain an area in which the convex hull is located as a second projection plane;

tailor the 3D mesh according to the second projection plane to remove a 3D mesh that is not the target object; and smooth a tailored 3D mesh to obtain the 3D model.

In some embodiments, the apparatus further includes a screening unit 1506, and the screening unit 1506 is configured to:

remove images with a similarity greater than a preset value in the at least two initial images.

In addition, the embodiments of this application further provide a storage medium, the storage medium being configured to store a computer program, and the computer program being configured to perform the method according to the foregoing embodiments.

The embodiments of this application further provide a computer program product including instructions, the instructions, when run on a computer, causing the computer to perform the method according to the foregoing embodiments.

For a detailed description of the program stored in the computer storage medium provided by the embodiments of this application, reference may be made to the foregoing embodiments, which is not repeated herein.

The embodiments in this specification are all described in a progressive manner. Description of each of the embodiments focuses on differences from other embodiments, and reference may be made to each other for the same or similar parts among the embodiments. The apparatus embodiments basically correspond to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In combination with the embodiments disclosed herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use this application. Various modifications to the embodiments are obvious to a person skilled in the art, and the general principles defined in this specification may be implemented in other embodiments without departing from the core idea or scope of this application. Therefore, this application is not limited to the embodiments shown in this specification, but needs to conform to the widest scope consistent with the principles and novel features disclosed in this specification.

What is claimed is:

1. A method for constructing a three-dimensional (3D) model of a target object performed by a computer device, the method comprising:
   obtaining at least two initial images of a target object from a plurality of shooting angles, the at least two initial images respectively including depth information of the target object, and the depth information indicating distances between a plurality of points of the target object and a reference position, wherein the reference position is a position at which a shooting lens used for photographing the target object is located;
   performing feature point detection on the at least two initial images respectively to obtain at least two feature points used for marking the target object in the at least two initial images respectively, the at least two feature points being used for identifying feature points of the target object at the same position in the at least two initial images respectively;
   obtaining an offset between the at least two feature points in the at least two initial images, the offset being used for identifying a difference in coordinates between the feature points of the target object at the same position in different initial images;
   obtaining a camera pose of the target object in the at least two initial images according to the offset, the camera pose being used for representing movement of the target object relative to the reference position in different initial images;
   obtaining first point cloud information corresponding to the at least two initial images respectively according to the depth information in the at least two initial images;
   fusing the first point cloud information respectively corresponding to the at least two initial images into second point cloud information according to the camera pose, the fusing the first point cloud information further including:
   determining one of the at least two initial images as a first frame and the others of the at least two initial images as second frames;
   moving points of the second frames to a respective shooting angle of the first frame according to the camera pose; and
   merging overlapping first points in the first point cloud information into a second point, the second point being a point in the second point cloud information; and
   constructing a 3D model of the target object according to the second point cloud information.

2. The method according to claim 1, wherein the merging overlapping first points in the first point cloud information into a second point at further comprises:
   assigning weights to the first points in the at least two initial images respectively; and
   merging the overlapping first points into the second point according to the weights.

3. The method according to claim 2, wherein the assigning weights to the first points in the at least two initial images respectively further comprises:
   assigning weight values to the first points according to at least one of a shooting angle, an image noise value, or a normal direction of initial images in which the first points are located.

4. The method according to claim 1, wherein the merging overlapping first points in the first point cloud information into a second point further comprises:
obtaining, when there are two overlapping first points in a first initial image, a first point having a smaller absolute value of a depth difference with a first point in the first frame from the first initial image, to perform point cloud fusion with the first point in the first frame so as to obtain the second point, the first initial image being an image other than the first frame in the at least two initial images.

5. The method according to claim 1, wherein the constructing a 3D model of the target object according to the second point cloud information further comprises:
performing Poisson reconstruction on the second point cloud information to obtain a 3D mesh of the target object, the 3D mesh being a non-porous surface connecting points in the second point cloud information; and
tailoring and smoothing the 3D mesh to obtain the 3D model.

6. The method according to claim 5, wherein the tailoring and smoothing the 3D mesh to obtain the 3D model further comprises:
projecting the 3D mesh in a direction perpendicular to a lens surface according to the feature points to obtain a first projection plane;
connecting the feature points to form a convex hull in the first projection plane, and obtaining an area in which the convex hull is located as a second projection plane;
tailoring the 3D mesh according to the second projection plane to remove a 3D mesh that is not the target object; and
smoothing a tailored 3D mesh to obtain the 3D model.

7. The method according to claim 1, further comprising:
before obtaining the first point cloud information corresponding to the at least two initial images respectively according to the depth information in the at least two initial images:
removing images with a similarity greater than a preset value in the at least two initial images.

8. A computer device, comprising: a processor, and a memory, the memory storing program instructions that, when executed by the processor, cause the computer device to perform a method for constructing a three-dimensional (3D) model of a target object including:
obtaining at least two initial images of a target object from a plurality of shooting angles, the at least two initial images respectively including depth information of the target object, and the depth information indicating distances between a plurality of points of the target object and a reference position, wherein the reference position is a position at which a shooting lens used for photographing the target object is located;
performing feature point detection on the at least two initial images respectively to obtain at least two feature points used for marking the target object in the at least two initial images respectively, the at least two feature points being used for identifying feature points of the target object at the same position in the at least two initial images respectively;
obtaining an offset between the at least two feature points in the at least two initial images, the offset being used for identifying a difference in coordinates between the feature points of the target object at the same position in different initial images;
obtaining a camera pose of the target object in the at least two initial images according to the offset, the camera pose being used for representing movement of the target object relative to the reference position in different initial images, and the reference position being a position at which a shooting lens used for photographing the target object is located;
obtaining first point cloud information corresponding to the at least two initial images respectively according to the depth information in the at least two initial images;
fusing the first point cloud information respectively corresponding to the at least two initial images into second point cloud information according to the camera pose, the fusing the first point cloud information further including:
determining one of the at least two initial images as a first frame and the others of the at least two initial images as second frames;
moving points of the second frames to a respective shooting angle of the first frame according to the camera pose; and
merging overlapping first points in the first point cloud information into a second point, the second point being a point in the second point cloud information; and
constructing a 3D model of the target object according to the second point cloud information.

9. The computer device according to claim 8, wherein the merging overlapping first points in the first point cloud information into a second point further comprises:
assigning weights to the first points in the at least two initial images respectively; and
merging the overlapping first points into the second point according to the weights.

10. The computer device according to claim 9, wherein the assigning weights to the first points in the at least two initial images respectively further comprises:
assigning weight values to the first points according to at least one of a shooting angle, an image noise value, or a normal direction of initial images in which the first points are located.

11. The computer device according to claim 8, wherein the merging overlapping first points in the first point cloud information into a second point further comprises:
obtaining, when there are two overlapping first points in a first initial image, a first point having a smaller absolute value of a depth difference with a first point in the first frame from the first initial image, to perform point cloud fusion with the first point in the first frame so as to obtain the second point, the first initial image being an image other than the first frame in the at least two initial images.

12. The computer device according to claim 8, wherein the constructing a 3D model of the target object according to the second point cloud information further comprises:
performing Poisson reconstruction on the second point cloud information to obtain a 3D mesh of the target object, the 3D mesh being a non-porous surface connecting points in the second point cloud information; and
tailoring and smoothing the 3D mesh to obtain the 3D model.

13. The computer device according to claim 12, wherein the tailoring and smoothing the 3D mesh to obtain the 3D model further comprises:
projecting the 3D mesh in a direction perpendicular to a lens surface according to the feature points to obtain a first projection plane;

connecting the feature points to form a convex hull in the first projection plane, and obtaining an area in which the convex hull is located as a second projection plane;

tailoring the 3D mesh according to the second projection plane to remove a 3D mesh that is not the target object; and smoothing a tailored 3D mesh to obtain the 3D model.

14. The computer device according to claim 8, wherein the method further comprises:

before obtaining the first point cloud information corresponding to the at least two initial images respectively according to the depth information in the at least two initial images:

removing images with a similarity greater than a preset value in the at least two initial images.

15. A non-transitory computer-readable storage medium, configured to store program instructions, the program instructions, when executed by a processor of a computer device, causing the computer device to perform a method for constructing a three-dimensional (3D) model of a target object including:

obtaining at least two initial images of a target object from a plurality of shooting angles, the at least two initial images respectively including depth information of the target object, and the depth information indicating distances between a plurality of points of the target object and a reference position, wherein the reference position is a position at which a shooting lens used for photographing the target object is located;

performing feature point detection on the at least two initial images respectively to obtain at least two feature points used for marking the target object in the at least two initial images respectively, the at least two feature points being used for identifying feature points of the target object at the same position in the at least two initial images respectively;

obtaining an offset between the at least two feature points in the at least two initial images, the offset being used for identifying a difference in coordinates between the feature points of the target object at the same position in different initial images;

obtaining a camera pose of the target object in the at least two initial images according to the offset, the camera pose being used for representing movement of the target object relative to the reference position in different initial images;

obtaining first point cloud information corresponding to the at least two initial images respectively according to the depth information in the at least two initial images;

fusing the first point cloud information respectively corresponding to the at least two initial images into second point cloud information according to the camera pose, the fusing the first point cloud information further including:

determining one of the at least two initial images as a first frame and the others of the at least two initial images as second frames;

moving points of the second frames to a respective shooting angle of the first frame according to the camera pose; and merging overlapping first points in the first point cloud information into a second point, the second point being a point in the second point cloud information; and constructing a 3D model of the target object according to the second point cloud information.

16. The non-transitory computer-readable storage medium according to claim 15, wherein the constructing a 3D model of the target object according to the second point cloud information further comprises:

performing Poisson reconstruction on the second point cloud information to obtain a 3D mesh of the target object, the 3D mesh being a non-porous surface connecting points in the second point cloud information; and tailoring and smoothing the 3D mesh to obtain the 3D model.

17. The non-transitory computer-readable storage medium according to claim 15, wherein the merging overlapping first points in the first point cloud information into a second point further comprises:

assigning weights to the first points in the at least two initial images respectively; and merging the overlapping first points into the second point according to the weights.

18. The non-transitory computer-readable storage medium according to claim 15, wherein the merging overlapping first points in the first point cloud information into a second point further comprises:

obtaining, when there are two overlapping first points in a first initial image, a first point having a smaller absolute value of a depth difference with a first point in the first frame from the first initial image, to perform point cloud fusion with the first point in the first frame so as to obtain the second point, the first initial image being an image other than the first frame in the at least two initial images.

19. The non-transitory computer-readable storage medium according to claim 15, wherein the method further comprises:

before obtaining the first point cloud information corresponding to the at least two initial images respectively according to the depth information in the at least two initial images:

removing images with a similarity greater than a preset value in the at least two initial images.

* * * * *